Nov. 11, 1969    C. L. WALLACE, JR    3,478,343
VIBRATION INTEGRATING ALARM

Filed Dec. 27, 1965    3 Sheets-Sheet 1

Clarence L. Wallace, Jr.,
INVENTOR.

BY.

GOLOVE & KLEINBERG,
ATTORNEYS.

Clarence L. Wallace, Jr.,
INVENTOR.

BY.

GOLOVE & KLEINBERG,
ATTORNEY.

Nov. 11, 1969  C. L. WALLACE, JR  3,478,343
VIBRATION INTEGRATING ALARM

Filed Dec. 27, 1965  3 Sheets-Sheet 3

Clarence L. Wallace, Jr.,
INVENTOR.

BY.

GOLOVE & KLEINBERG,
ATTORNEY.

United States Patent Office 3,478,343
Patented Nov. 11, 1969

3,478,343
VIBRATION INTEGRATING ALARM
Clarence L. Wallace, Jr., San Diego, Calif., assignor, by mesne assignments, to Illinois Tool Works Inc., Chicago, Ill., a corporation of Delaware
Filed Dec. 27, 1965, Ser. No. 516,420
Int. Cl. G08b *21/00;* H01h *27/04, 35/02*
U.S. Cl. 340—261     9 Claims

ABSTRACT OF THE DISCLOSURE

Apparatus for detecting and signalling the presence of vibratory energy in excess of a predetermined value includes a receiver portion for receiving vibrations, an elongated transmitter member for transmitting the vibrations from the receiver to an interposer means such as a plate, disk or cylinder which is normally frictionally held between the elongated member and a support against movement by a resilient biasing means. When the vibration of the elongated member in the same direction as the biasing force applied to the interposer means is sufficiently strong to change the force between the elongated member and the interposer means from a static to a dynamic one, the biasing means will cause the interposer means to move and actuate a signal.

---

This invention relates to apparatus for detecting and signalling the presence of vibratory energy and, more particularly, to apparatus which is responsive to applied vibration in the audio frequency range and of predetermined amplitude and duration.

In devices readily available in the prior art for the detection of the existence and persistence of sonic range vibratory energy, systems for the setting of a threshold for response and the prevention of operation resulting from random or accidental energy impulses tend to be complex and expensive. For example, in the commercially available "burglar-alarm" type of device installed on vehicles to prevent their theft, a rather sensitively balanced mass is supported in equilibrium and virtually any shock impulse, applied to the vehicle, will set the mass into vibration which in turn controls an electric circuit, usually to the horn of the vehicle. However, such a device, while sensitive to impinging energy, is too sensitive for many applications and, for example, can be triggered by virtually any physical contact with the vehicle, or perhaps by the passing of a heavily loaded truck which produces street vibrations.

It is possible, through the use of electronic timing circuits, to provide a device which can "ignore" either extremely low amplitude signals or signals of relatively short duration, so that a threshold can be established whereupon a predetermined quantum of energy must impinge upon the detector circuit within a prescribed time before any signal is generated. The predetermined quantum may represent, for example, some function of amplitude and duration.

Electronic circuits are readily available which can perform these functions and which can effectively "integrate" energy so that a signal is produced in response to a quantum of energy, but such circuits can be expensive, complex, and would require a power supply. If the signalling device is to provide an electrical signal upon detecting the predetermined quantum of energy, then an auxiliary power supply would be necessary, to provide the signal and therefore the entire system can become unreliable.

What is needed, and what is provided by the present invention, is an inexpensive, simple, easily fabricated mechanical device which can respond to the presence of vibratory energy in the sonic range. Such energy is hereinafter designated as "sonic energy," but is intended to include true sonic waves transmitted through the atmosphere and audio frequency mechanical vibration which may exist in other media and which are produced as a result of a physical event or activity.

While the underlying physical principles which control the operation of the present invention are not fully known, it is believed that the present invention takes advantage of the fact that, for many materials, the coefficient of the static friction differs from and is greater than the coefficient of dynamic friction for the same combination of materials. Accordingly, the present invention will be described in such terms although such an explanation is not intended to be a limitation on the application of the principles of the present invention.

According to a preferred embodiment, an electrical circuit is created between a metallic block having a smooth surface and a relatively stiff wire which is spring-loaded into contact with the surface of the block. An alarm or signal can be energized when the arm is in physical, electrical contact with the block. The cricuit is interrupted by the interposition of a relatively smooth-surfaced insulating plate, between the block and the arm.

A biasing force is applied to the interposing plate which urges motion in a preferred direction. This bias force is balanced by the forces of static friction between the plate and the adjacent surface of the block and the area of contact of the arm.

Since the component of force normal to the surface of the plate that is provided by the arm is adjustable, the frictional force is thereby adjustable, as well. The system is set so that the plate is substantially in equilibrium.

Means are provided to convert impinging sonic energy into relative motion between the interposing plate and the members supporting it. When impinging sonic energy is of sufficient amplitude and frequency, relative motion develops, for example, as between the plate and the arm, and in one embodiment, the arm is driven in reciprocating fashion at the surface of the plate.

This linear motion, once commenced, converts the static frictional coupling between the arm and plate to a dynamic friction coupling, which is of smaller magnitude. Under certain conditions of adjustment, therefore, the holding frictional forces are then less than the bias force and, accordingly, the plate will start to slide.

Once the plate is in motion, the static friction coupling between the plate and block is replaced by a dynamic friction coupling of a lesser magnitude and, it would appear that the plate could then continue to move, even if the impinging sonic vibration were to cease. This, of course, is subject to the limitation that the interposed member has sufficient inertia to overcome whatever holding force may be imposed by the moving arm, when the motion is of a direction of velocity equal to that of the plate, and a static frictional holding force is again established. In such an embodiment, the device would act as a "trigger" in that once a predetermined energy threshold was exceeded, the device would operate to provide its signal.

Other adjustments are possible in which plate motion is permitted, only so long as the impinging sonic energy of predetermined frequency and amplitude is present. In this adjustment, it is believed that motion of the plate takes place only when the arm exerts a force which *adds* to the bias force. This would occur when the arm moves in the direction of the bias force, at a velocity which matches that of the moving plate, enabling the re-establishment of a static friction couple. An increment of motion is therefore applied to the plate in the direction of the bias force, as long as the relative motion that exists is between the plate and the block rather than the arm and the plate.

In other embodiments and configurations, a conducting plate can replace the insulating plate and a non-conducting area may exist at the point of contact between the arm and the block, resulting in a "normally closed" configuration until the device operates, at which time the circuit would then be held "open." In yet other configurations, the plate could be provided with conductive and non-conducting segments upon the surface, much in the fashion of a linear encoder, whereby the position of the plate relative to the arm might be accurately signalled, either through the use of a quantized code pattern or through the use of a resistive gradient between conductivity and non-conductivity. The former would, of course, represent a digital signalling device while the latter would correspond to an analog signalling device.

In both cases, the amount of plate motion can be signalled, representing a mechanical integration of applied energy. In other alternative schemes, an optical encoding apparatus can be used in which the plate would be a transparent member with an appropriate opaque code pattern imposed.

The present invention is characterized by:
(a) energy receiver means, adapted to receive vibratory energy;
(b) energy transmitter means connected to said receiving means for selectively transmitting preferred direction components of the impinging vibrations;
(c) interposer means, adapted to be subjected to a biasing force in said preferred direction, and frictionally held in opposition to said biasing force by said energy transmitter means;
(d) signalling means, operable in response to a predetermined increment of displacement of said interposer means in said preferred direction.

In response to the preferred direction motion components of the impinging mechanical vibrations, the interposer member under the force of the bias is caused to slide with respect to the energy transmitter means, since the dynamic friction force is less than the bias force. The signalling means may be adapted to either signal a predetermined displacement of the interposer member or to provide a signal during the period that energy is being received.

The novel features which are believed to be characteristic of the invention will be better understood from the following description considered in connection with the accompanying drawings in which preferred embodiments of the invention are illustrated by way of example. It is to be expressly understood, however, that the drawings are for the purpose of illustration and description only, and are not intended as a definition of the limits of the invention.

Figure 1:
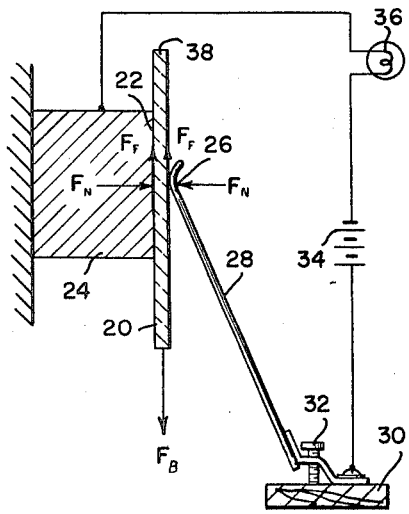
FIG. 1 is a diagrammatic representation of a preferred embodiment of the invention, operable as a "noramlly open" switch which closes upon receiving a predetermined quantum of energy.

Referring to the drawings, there is shown in FIG. 1 a diagrammatic representation of a preferred embodiment of the invention. A non-conductive plate 20, for example a glass wafer, is shown in contact with and being held between a surface 22 of a supporting block 24 made of metal, and the end 26 of an elongated member 28. The elongated member 28 is attached to a base 30, which is adapted to vibrate in response to impinging energy of the audio frequency mechanical vibrations. The normal forces $F_N$ acting on the plate 20 by the member 28, may be adjusted by an adjusting screw 32. A normal force $F_N$ is also produced at the interface between the surface of the plate 20 and the surface 22 of the block 24. These normal forces result in frictional forces $F_F$ parallel to the surfaces of the plate 20. A bias force $F_B$ is applied to the plate 20 in a preferred direction, parallel to the plane of the surface 22 of the block 24. The magnitude of the frictional forces $F_F$ are directly related to the coefficients of friction of the materials used and the normal forces $F_N$.

An electrical signalling circuit is provided, which is connected between the block 24 and the elongated member 28. In this embodiment, the block 24 and the member 28 are conductors, and the plate 38 is a non-conductor. A voltage source 34 is provided, and a signalling device 36 completes the circuit.

In response to applied "mechanical" vibrations, the base 30 is driven into vibration at a characteristic frequency. These vibrations are transmitted by the member 28, and the tip 26 of the member 28 is driven in translation in the preferred direction, with a corresponding amplitude and frequency. The block 24 in the embodiment of FIG. 1 is considered stationary, even though it may oscillate also.

If the difference between the static and dynamic coefficients of friction at the interfaces between the plate 20, the surface 22, and the tip 26, respectively, are not too great, then the following appears to explain the operation of the invention. It is to be understood that any explanation advanced to describe the phenomenon is not intended as an exhaustive description since to a great extent, the exact physical principles which control the operation are not fully understood.

When the tip 26 moves in response to applied vibrations in the direction opposed to the bias force $F_B$, the static friction opposed to such movement is overcome, while the static friction in the direction of movement is unaffected and the tip 26 slides along the surface of the plate 20, in the direction opposed to the applied force $F_B$. The plate 20 still has applied to it frictional forces $F_F$ opposing the force $F_B$ and thus remains at rest, in contact with the surface 20 of the block 24.

When the tip 26 stops and is caused to move in the direction of the applied force $F_B$, the static friction between the end 26 and the plate 20 is in the same direction as the applied force $F_B$. Opposing these forces is the static friction force $F_F$ between the plate 20 and the block surface 22. If the static friction opposing relative motion between the plate 20 and the block 24 is overcome by the combined bias and frictional forces, the plate 20 will slide over the surface 22 of the block 24 in the direction of the bias force $F_B$.

The plate 20 moves relative to the block 24, once each vibration cycle, this movement resulting from the combination of frictional forces and the bias force. The total distance traveled by the plate 20, relative to the block 24, during each cycle, is equal to the peak-to-peak amplitude of the vibrations in the preferred direction of the tip 26. There is no relative movement of the plate 20 during the travel of the tip 26 in the direction opposed to the bias force $F_B$. When the vibrations of the tip 26 cease, or when the force in the preferred direction attributed to these vibrations are not so great as to overcome the static friction forces at the interfaces, movement of the plate 20 relative to the block 24 will also cease.

In response to the vibrations, when the end 38 of the plate 20 proceeds beyond the point of contact with the tip 26, the frictional forces attributed to the normal forces $F_N$ will be relieved, and the plate 20 will move in response to the applied force $F_B$. When this occurs, the tip 26 comes into contact with the surface 22 of the block 24, thereby completing the electrical circuit and causing the signalling device 36 to emit signals.

If conditions exist such that the static friction forces *are much greater* than the dynamic friction forces, and the applied force $F_B$ is adjusted so that it is equal to or less than the static friction forces, and such that the applied force $F_B$ is greater than the dynamic friction forces, then it would be possible to cause movement of the plate 20 in the direction of the applied force $F_B$ whenever the elements of the system are in relative motion. It is therefore possible to supply conditions that will cause the motion of the plate 20 to continue, once motion of the plate 20 relative to the block 24 has started, and this motion will continue even after the vibrations have ceased. Under such circumstances, continuous movement of the plate 20 will be triggered by the impinging vibrations, such triggering resulting in response by the signalling device 36.

Returning to the above example where the relative movement of the plate 20 and the motion of the tip 26 is in the direction of the bias force $F_B$, it is seen that the invention performs an integrating function as regarding individual displacements of the plate 20 relative to the block 24. Since each displacement is dependent upon the amplitude of the vibrations of the tip 26 and the time over which those vibrations persist, the bias force $F_B$ and the friction force $F_F$ may be adjusted in order to provide a rating based upon a convenient quantum of energy, such as is represented by time-amplitude product. Furthermore, the bias force $F_B$ and the normal force $F_N$ can be adjusted in order that the invention exhibit differing thresholds of response. The invention may also be made frequency sensitive, for example, by altering the characteristics of the base 30 in order to respond to a specified range of frequencies.

Figure 2:
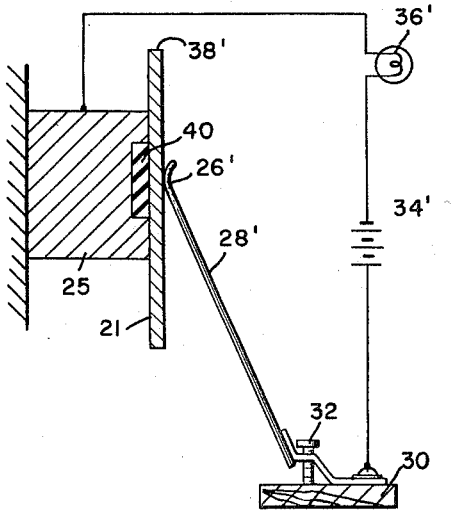
FIG. 2 is a diagrammatic representation of an alternative embodiment of the invention, which is operable as a "normally closed" switch which opens upon receiving a predetermined quantum of energy.

In FIG. 2 there is represented an alternative embodiment of the present invention. This embodiment is very similar to the embodiment shown in FIG. 1 with the exception that the interposer plate 21 is a conductive material, and a non-conductive insert 40 is situated in the block 24'. When the conductive plate 21 is interposed between the tip 26' of the member 28', an electrical circuit is completed and the signalling device 36' provides the appropriate signals. When the end 38' of the conductive plate 21 proceeds beyond the tip 26' of the member 28', the tip 26' comes into contact with the non-conductive insert 40. At that point, the electrical circuit is interrupted and the signal is absent, or a similar circuit may be used to generate complementary signals.

Figure 4:
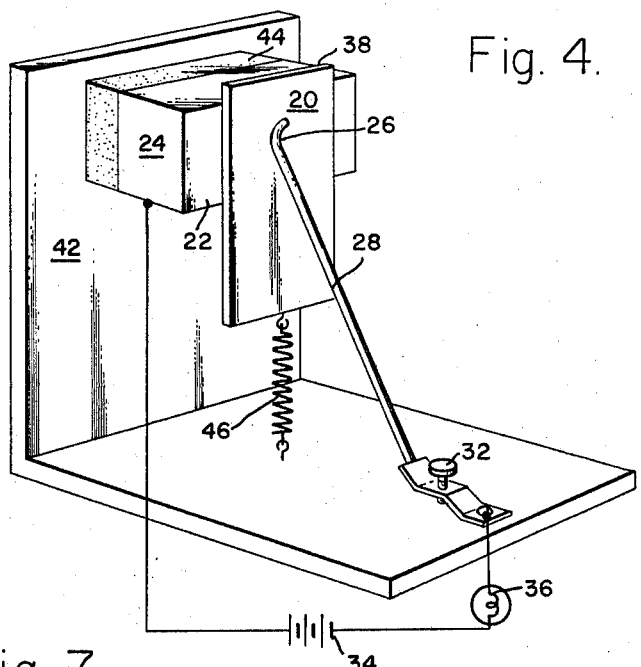
FIG. 4 is a perspective view of the embodiment of FIG. 3.

In FIG. 4 there is shown a side sectional view of a device similar to the embodiment of the invention shown in FIG. 1, and in FIG. 4 there is shown a perspective view of this embodiment. The frame 42 serves the dual purpose as a receiver of the applied vibrations and is a support structure for the combination of the resilient block 44 and the metal block 24. The metal block 24 is effectively an inertial mass which remains substantially at rest in spite of the presence of vibrations by the frame 42. The applied force in the preferred direction is supplied by the spring 46. Alternatively, the applied force may be supplied by the gravitational force on the mass of the plate 20, if the preferred direction is determined to be parallel to the gravitational force.

Figure 5:
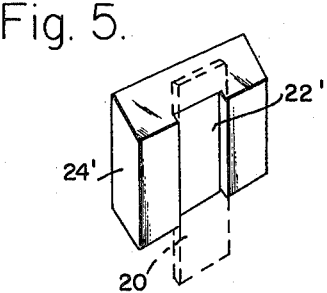
FIG. 5 is a perspective view of an alternative configuration of the inertial mass of FIGS. 3 and 4.
Figure 3:
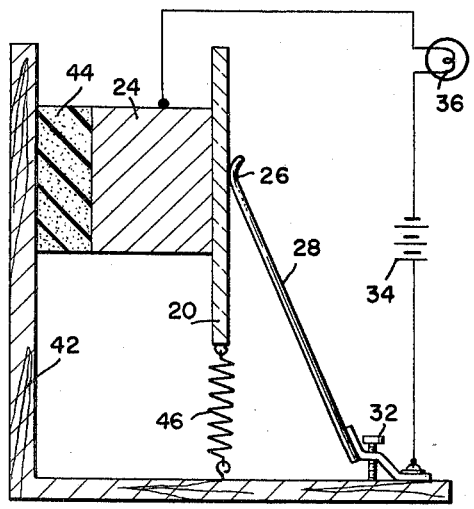
FIG. 3 is a side sectional view of yet another embodiment of the invention.

FIG. 5 shows an alternative configuration 24' of the inertial mass 24 of FIGS. 1, 3 and 4. The surface 22' is shown as being recessed in the inertial mass 24' in such a manner that the plate 20 may be inserted in the recess so that it may slide in the preferred direction only.

Figure 6:
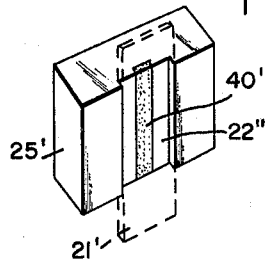
FIG. 6 is a perspective view of an alternative configuration of the inertial mass of FIG. 5.

In FIG. 6 there is shown an alternative configuration 25' of the inertial mass shown as the block 25 in the embodiment of FIG. 2. The surface 22" is shown recessed so that the conductive plate 21' may be inserted in the recess so that its movement is restricted to the preferred direction. Inserted within the recess is a non-conductive insert which extends throughout the length of the inertial mass 25' in the preferred direction. When the conductive plate 21' proceeds beyond the tip 26 of the member 28, the tip 26 will make contact with the non-conductive insert 40', causing the electrical circuit to open.

Figure 7:
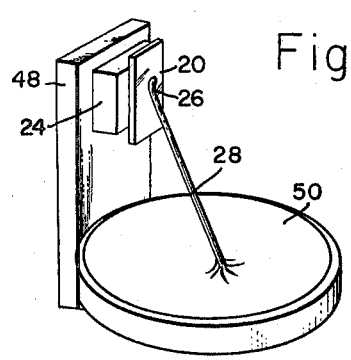
FIG. 7 is a perspective view of yet another embodiment of the present invention, having a diaphragm responsive to impinging audio frequency vibration.

In FIG. 7 there is shown yet another alternate embodiment of the invention. In this embodiment, the metal block 24 is mounted directly on the support structure 48, and the diaphragm 50 is attached to the support structure 48 as shown. The elongated member 28 is attached to the diaphragm 50, and vibrates along with the diaphragm 50 in response to the applied vibrations. If the plate 20 is in a vertical position, the bias force is then attributed to its mass and the gravitational constant. The force which activates relative movement of the plate 20 with respect to the block 24 is attributed to the difference between the amplitudes of the vibrations in the preferred direction of the block 24 and the tip 26 of the member 28.

Figure 8:
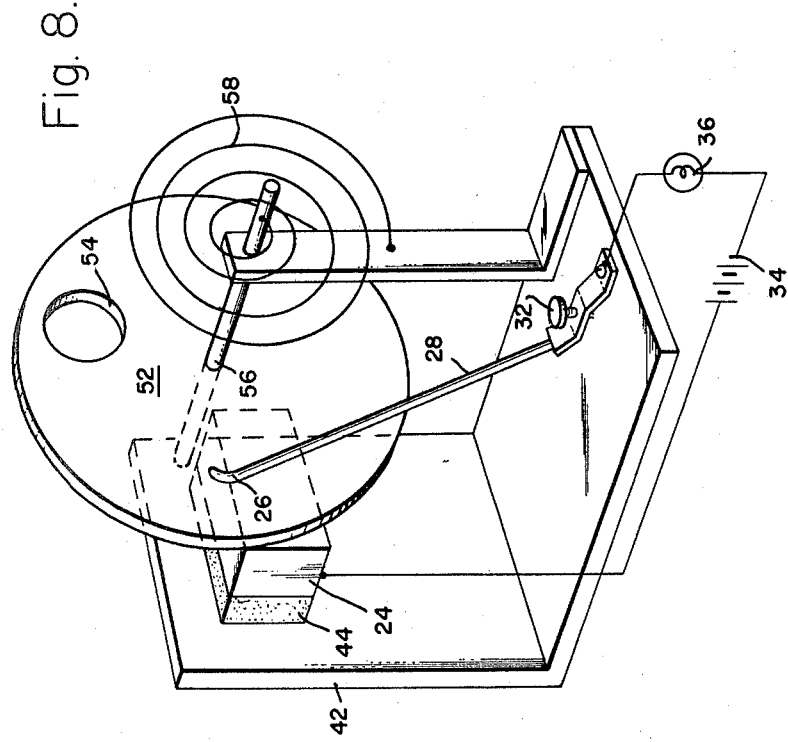
FIG. 8 is a perspective view of an alternative embodiment of the present invention employing a rotatably movable member.

In FIG. 8 there is shown still another alternative embodiment of the present invention. A disk 52 separates the tip 26 of the elongated member 28 and the block 22. The disk 52 contains an apperture 54 located so that when the disk turns in response to the motion of the tip 26, the apperture 54 enters the path of the tip 26 so that the tip 26 comes into contact with the inertial mass 24. The disk is adapted to rotate about a shaft 56 which is rotatably attached to the frame 42 and upon which a torque is applied by the spring 58. The spring 58 may be replaced by a constant torque motor, both of which supply the bias force in the preferred direction on the interposer disk 52.

Figure 9:
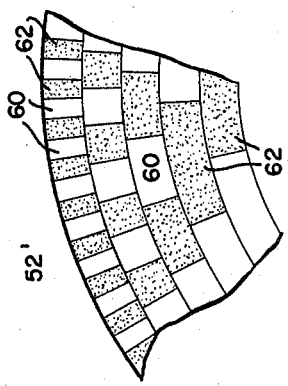
FIG. 9 is a segment of a disk useful in the embodiment of FIG. 8.

By supplying the disk 52 with differing characteristics, the embodiment of FIG. 8 may be employed to accomplish various purposes. For example, the disk 52 may be replaced by a glass disk 52', a segment of which is shown in FIG. 9, which includes code patterns such as, for example, an optical code pattern which is provided by a suitable arrangement of transparent areas 60 and translucent areas 62. The code pattern corresponding to a particular displacement of the disk 52' may be signalled by appropriate means, for example, by situating a light source and a photo electric cell assembly at appropriate positions on the alternate sides of the disk 52'.

Figure 10:
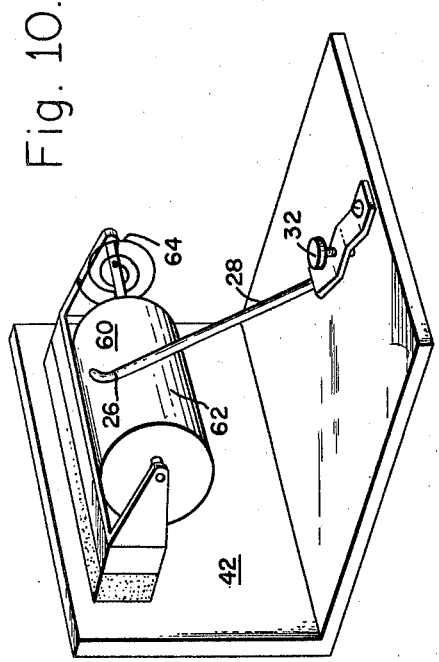
FIG. 10 is a perspective view of still another alternative embodiment of the present invention, utilizing a cylinder as the movable member.

In FIG. 10 there is shown yet another alternative embodiment of the present invention. A cylinder 60 which may be caused to rotate about a longitudinal axis, is rotatably mounted along that axis to the frame 42 as shown. The preferred direction is determined by the tangent at the surface 62 at its point of contact with the tip 26 of the elongated member 28. The bias force is provided by the spring 64, which may be replaced by a constant torque motor. A signal may be produced after a predetermined rotation of the surface 62 by the provision of an appropriately positioned conducting area on the surface 62, which is connected to a signalling circuit. The surface 62 may also be encoded, for example in the manner shown in FIG. 9, in order to provide information based upon rotation of the cylinder 60.

In the embodiments shown, reset mechanisms may also be provided in order to reset the device in a starting position after completion of its operation.

The several embodiments shown herein may be combined to produce variations of these embodiments or to produce other embodiments of the present invention. For example, the embodiments shown in FIGS. 7 and 8 may be combined in order to include a disk which rotates in response to a vibrating diaphragm.

What is claimed as new is:

1. Apparatus which responds to the presence of oscillatory energy, comprising:
   (A) receiver means for reeciving and detecting applied oscillatory energy having preferred direction components and for converting said energy into mechanical vibrations of corresponding frequency and amplitude;
   (B) transmitter means include an electrically conductive elongated member attached at one end of said receiver means and having a tip at the other end which reciprocates in said preferred direction in response to said receiver means vibrations;
   (C) interposer means including a disk, rotatably mounted in the plane between said transmitter means and a holding means, said disk being adapted to have a bias force applied thereto in said preferred direction;
   (D) holding means including a suport member, said elongated member being adapted to cooperate with said support member to produce a frictional holding force for frictionally holding said disk to restrain rotation of said disk against sliding movement relative to said elongated member in response to an applied bias force; and
   (E) signalling means for signalling displacement of said disk in said preferred direction;
whereby the preferred direction oscillatory energy components cause said interposer means to slide in said preferred direction with respect to said transmitter means and said holding means, said signalling means providing signals representing the displacement resulting therefrom.

2. The apparatus of claim 1, above, wherein:
   (A) said elongated member and said support member are electrically conductive and said disk is electrically non-conductive, said disk having an aperture in the face which, after a predetermined rotation of said disk, allows said elongated member tip to enter therein and contact with said support member; and
   (B) said signalling means include an electrical circuit including a signalling device, connected to said elongated member and said support member, said circuit being normally open by the interposition of said disk between said support member and said tip;
whereby, the preferred direction component vibrations produce reciprocation of said tip, reducing the frictional hold on said disk, causing said disk to rotate in said preferred direction with respect to said support member, until said aperture is positioned to permit said elongated member tip to come into contact with said support member, enabling said signalling circuit to produce a signal representing a specified rotation of said disk.

3. The apparatus of claim 2, above, wherein said receiver means include a diaphragm adapted to vibrate in response to applied oscillatory energy.

4. The apparatus of claim 1, above, wherein:
   (A) said disk includes a predetermined code pattern; and
   (B) said signalling means include apparatus operable in conjunction with said code pattern to provide a signal indication of disk displacement.

5. The apparatus of claim 4, above, wherein said receiver means include a diaphragm adapted to vibrate in response to applied oscillatory energy.

6. Apparatus which responds to the presence of oscillatory energy, comprising:
   (A) receiver means for receiving and detecting applied oscillatory energy having preferred direction components and for converting said energy into mechanical vibrations of corresponding frequency and amplitude;
   (B) transmitter means include an electrically conductive elongated member attached at one end to said receiver means and having a tip at the other end which reciprocates in said preferred direction in response to said receiver means vibrations;
   (C) interposer means including a cylinder having an axis and adapted to be connected to a source of rotational bias;
   (D) holding means including means for axially supporting said cylinder such that said cylinder is rotatable about said axis, said elongated member being adapted to produce a frictional holding force at the surface of said cylinder to restrain rotation of said cylinder in response to said bias force; and
   (E) signalling means for signalling displacement of said cylinder in said preferred direction;
whereby the preferred direction oscillatory energy components cause said interposer means to slide in said preferred direction with respect to said transmitter means and said holding means, said signalling means providing signals representing the displacement resulting therefrom.

7. The apparatus of claim 6, above, wherein said receiver means include a diaphragm adapted to vibrate in response to applied oscillatory energy.

8. The apparatus of claim 6, above, wherein:
   (A) said cylinder includes a predetermined code pattern; and
   (B) said signalling means include means operable in conjunction with said predetermined code pattern for providing a signal indicating relative cylinder rotational displacement.

9. Apparatus for detecting and signalling ambient audio frequency of oscillatory energy, comprising:
   (A) receiver means, for receiving and detecting applied oscillatory energy having preferred direction components and for converting said energy into mechanical vibration of corresponding frequency and amplitude;
   (B) transmitter means coupled to said receiver means for converting the mechanical vibration into reciprocating motion of corresponding frequency and amplitude;
   (C) interposer means;
   (D) resilient biasing means for applying a predetermined resilient biasing force to urge said interposer means to move in said preferred direction;
   (E) friction suport means carried by said transmitter means for normally frictionally supporting said interposer means against movement by said resilient biasing means, said friction support means being ineffective for preventing said movement when the oscillatory energy transmitted by said transmitter means through said friction support means in said preferred direction exceeds the predetermined amount of energy necessary to overcome the static friction force between the interposer means and the friction support means;
   (F) adjusting means for varying the force applied to said interposer means by said friction support means and thereby varying the predetermined amount of energy necessary to overcome said static friction force; and
   (G) signalling means, for signalling displacement of said interposing means with respect to said transmitting means;
whereby, received oscillatory energy in excess of a predetermined amount is converted into reciprocating motion between said transmitter means and said interposer means, alternately aiding and opposing applied bias forces, to allow slippage of said interposer means with respect to said transmitter means and said friction support means in said preferred direction, said signalling means providing an indication of displacement of said interposer means with respect to said transmitter means.

References Cited

UNITED STATES PATENTS

| | | | |
|---|---|---|---|
| 2,802,074 | 8/1957 | Pass | 200—61.19 |
| 2,396,699 | 3/1946 | Hayes et al. | 200—83 X |

FOREIGN PATENTS 3,398     1891    Great Britain.

JOHN W. CALDWELL, Primary Examiner

D. L. TRAFTON, Assistant Examiner

U.S. Cl. X.R.

73—71.2; 200—61.19, 61.45, 153.14; 340—262